United States Patent
Ho et al.

(10) Patent No.: US 10,732,910 B2
(45) Date of Patent: Aug. 4, 2020

(54) TRAY DEVICE CAPABLE OF RECOGNIZING TRAY MODULES

(71) Applicant: AVISION INC., Hsinchu (TW)

(72) Inventors: Jen-Chieh Ho, Taoyuan (TW); Ming-Chung Li, Hsinchu County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/186,579

(22) Filed: Nov. 11, 2018

(65) Prior Publication Data

US 2019/0187942 A1    Jun. 20, 2019

(30) Foreign Application Priority Data

Dec. 14, 2017    (TW) .............................. 106143908 A (51) Int. Cl.
*G06F 3/12*    (2006.01)
*G03G 15/00*    (2006.01)

(52) U.S. Cl.
CPC ........... *G06F 3/1229* (2013.01); *G03G 15/55* (2013.01); *G03G 15/6502* (2013.01); *G06F 3/122* (2013.01); *G06F 3/1279* (2013.01); *G03G 15/50* (2013.01)

(58) Field of Classification Search
CPC ...... G06F 3/1229; G06F 3/1279; G06F 3/122; G06F 3/1203; G03G 15/6502; G03G 15/55; G03G 15/50
USPC ....................................................... 358/1.15
See application file for complete search history.

(56) References Cited

U.S. PATENT DOCUMENTS

| | | | | |
|---|---|---|---|---|
| 4,446,472 A | * | 5/1984 | Kato | ........................ B41J 29/40 347/139 |
| 4,701,805 A | * | 10/1987 | Maeshima | ............. H04N 1/193 358/3.06 |
| 5,162,845 A | * | 11/1992 | Ariyama | ................ G03G 15/00 271/303 |

FOREIGN PATENT DOCUMENTS

| | | |
|---|---|---|
| CN | 1891478 A | 1/2007 |
| EP | 2 381 320 A1 | 10/2011 |
| EP | 2 347 909 B1 | 5/2014 |
| TW | 126710 | 1/1990 |
| TW | 461960 | 11/2001 |
| TW | 568449 | 12/2003 |

* cited by examiner

*Primary Examiner* — Tammy Paige Goddard
*Assistant Examiner* — Darryl V Dottin
(74) *Attorney, Agent, or Firm* — Winston Hsu (57) ABSTRACT

A tray device includes a host module, a tray module, and a communication module communicated between the host module and the tray module. The host module includes a host recognition circuit, a host connection circuit, and a host controller electrically connected to the host recognition circuit and the host connection circuit. The tray module includes a tray recognition circuit, a tray connection circuit, and a tray controller electrically connected to the tray recognition circuit and the tray connection circuit. The tray controller determines an installation ordinal number corresponding to the tray module according to a recognition signal generated by the tray recognition circuit. The tray controller sends the installation ordinal number to the host controller by the communication module when the tray connection circuit generates a connection signal.

3 Claims, 5 Drawing Sheets

TRAY DEVICE CAPABLE OF RECOGNIZING TRAY MODULES

BACKGROUND OF THE DISCLOSURE

1. Field of the Disclosure

The present disclosure relates to a tray device, and more particularly, to a tray device capable of recognizing tray modules.

2. Description of the Prior Art

A printing apparatus is usually equipped with multiple tray modules for accommodating paper with different sizes to provide flexible printing options for users. With advancement of printing technology, to ensure that all the tray modules are properly installed on the printing apparatus, the tray modules are configured to generate different signals and transmit the signals to the printing apparatus for allowing the printing apparatus to recognize the tray modules when the tray modules are installed on the printing apparatus. However, there is only one-to-one communication between the tray modules and the printing apparatus. The printing apparatus has to send inquiries to the tray modules and wait for responses transmitted from the tray modules one by one. The printing apparatus cannot determine how many tray modules are installed on the printing apparatus until there is no further received response. Therefore, the more the tray modules are installed on the printing apparatus, the longer it takes for the printing apparatus to recognize the tray modules.

SUMMARY OF THE DISCLOSURE

Therefore, it is an objective of the present disclosure to provide a tray device capable of recognizing tray modules for solving the aforementioned problems.

To achieve the aforementioned objective, the present disclosure discloses a tray device capable of recognizing tray modules. The tray device includes a host module, at least one tray module and a communication module. The host module includes a host recognition circuit, a host connection circuit and a host controller electrically connected to the host recognition circuit and the host connection circuit. The at least one tray module includes a tray recognition circuit, tray connection circuit and tray controller. The tray recognition circuit is for generating a recognition signal. The tray connection circuit is for generating a connection signal. The tray controller is electrically connected to the tray recognition circuit and the tray connection circuit. The tray controller determines an installation ordinal number corresponding to the at least one tray module according to the recognition signal. The communication module is coupled to the host module and the at least one tray module. The tray controller transmits the installation ordinal number to the host controller of the host module by the communication module when the tray connection circuit generates the connection signal.

To achieve the aforementioned objective, the present disclosure discloses a tray device capable of recognizing tray modules. The tray device includes a host module, N tray modules and a communication module. The host module includes a host connection circuit, a host recognition circuit and a host controller. The host connection circuit includes a host connection voltage source, a host connection output terminal and a host connection resistor. The host connection voltage source is coupled to the host connection output terminal. The host connection resistor is coupled to the host connection voltage source and the host connection output terminal. The host recognition circuit includes a host recognition voltage source and N host recognition output terminals. A first host recognition output terminal of the N host recognition output terminals is coupled to the host recognition voltage source. The host controller is electrically connected to the host connection circuit and the host recognition circuit. Each of the N tray modules includes a tray recognition circuit, a tray connection circuit and a tray controller. The tray recognition circuit includes N tray recognition ground sources, N tray recognition input terminals, N tray recognition resistors and N tray recognition output terminals. Each of the N tray recognition input terminals is coupled to the corresponding tray recognition ground source. Each of the N tray recognition resistors is coupled to the corresponding tray recognition input terminal and the corresponding tray recognition ground source. A second tray recognition output terminal to an Nth tray recognition output terminal of the N tray recognition output terminals are respectively coupled to a first tray recognition input terminal to an N−1th tray recognition input terminal of the N tray recognition input terminals. The tray connection circuit includes a tray connection ground source, a tray connection input terminal, a tray connection voltage source, a tray connection output terminal and a tray connection resistor. The tray connection input terminal is coupled to the tray connection ground source. The tray connection output terminal is coupled to the tray connection voltage source. The tray connection resistor is coupled to the tray connection voltage source and the tray connection output terminal. The tray controller is electrically connected to the tray recognition circuit and the tray connection circuit. The communication module is coupled to the host module and the N tray modules. The N tray recognition input terminals of the tray recognition circuit of a first tray module of the N tray modules are respectively coupled to the N host recognition output terminals of the host recognition circuit of the host module. The tray connection input terminal of the tray connection circuit of the first tray module of the N tray modules is coupled to the host connection output terminal of the host connection circuit of the host module. The N tray recognition input terminals of the tray recognition circuit of each of a second tray module to an Nth tray module of the N tray modules are respectively coupled to the N tray recognition output terminals of the tray recognition circuit of each of the first tray module to an N−1th tray module of the N tray modules. The tray connection input terminal of the tray connection circuit of each of the second tray module to the Nth tray module of the N tray modules is coupled to the tray connection output terminal of the tray connection circuit of each of the first tray module to the N−1th tray module of the N tray modules. The tray recognition circuit of each of the N tray modules generates a corresponding recognition signal according to coupling relation of the N tray modules and the host module. The tray controller of each of the N tray modules determines a corresponding installation ordinal number according to the corresponding recognition signal. The tray connection output terminal of the tray connection circuit of the Nth tray module of the N tray modules is not grounded to allow the tray connection circuit of the Nth tray module of the N tray modules to generate a connection signal, and the tray controller of the Nth tray module of the N tray modules transmits an Nth installation ordinal number of the N installation ordinal numbers corresponding to the Nth tray module to the host controller of the host module by the communication module.

To achieve the aforementioned objective, the present disclosure further discloses a tray device capable of recognizing tray modules. The tray device includes a host module, N tray modules and a communication module. The host module includes a host connection circuit, a host recognition circuit, a host recognition circuit and a host controller. The host connection circuit includes a host connection ground source, a host connection output terminal and a host connection resistor. The host connection ground source is coupled to the host connection output terminal. The host connection resistor is coupled to the host connection ground source and the host connection output terminal. The host recognition circuit includes a host recognition ground source and N host recognition output terminals. A first host recognition output terminal of the N host recognition output terminals is coupled to the host recognition ground source. The host controller is electrically connected to the host connection circuit and the host recognition circuit. Each of the N tray modules includes a tray recognition circuit, a tray connection circuit and a tray controller. The tray recognition circuit includes N tray recognition voltage sources, N tray recognition input terminals, N tray recognition resistors and N tray recognition output terminals. Each of the N tray recognition input terminals is coupled to the corresponding tray recognition voltage source. Each of the N tray recognition resistors is coupled to the corresponding tray recognition input terminal and the corresponding tray recognition voltage source. A second tray recognition output terminal to an Nth tray recognition output terminal of the N tray recognition output terminals are respectively coupled to a first tray recognition input terminal to an N−1th tray recognition input terminal of the N tray recognition input terminals. The tray connection circuit includes a tray connection voltage source, a tray connection input terminal, a tray connection ground source, a tray connection output terminal and a tray connection resistor. The tray connection input terminal is coupled to the tray connection voltage source. The tray connection output terminal is coupled to the tray connection ground source. The tray connection resistor is coupled to the tray connection ground source and the tray connection output terminal. The tray controller is electrically connected to the tray recognition circuit and the tray connection circuit. The communication module is coupled to the host module and the N tray modules. The N tray recognition input terminals of the tray recognition circuit of a first tray module of the N tray modules are respectively coupled to the N host recognition output terminals of the host recognition circuit of the host module. The tray connection input terminal of the tray connection circuit of the first tray module of the N tray modules is coupled to the host connection output terminal of the host connection circuit of the host module. The N tray recognition input terminals of the tray recognition circuit of each of a second tray module to an Nth tray module of the N tray modules are respectively coupled to the N tray recognition output terminals of the tray recognition circuit of each of the first tray module to an N−1th tray module of the N tray modules. The tray connection input terminal of the tray connection circuit of each of the second tray module to the Nth tray module of the N tray modules is coupled to the tray connection output terminal of the tray connection circuit of each of the first tray module to the N−1th tray module of the N tray modules. The tray recognition circuit of each of the N tray modules generates a corresponding recognition signal according to coupling relation of the N tray modules and the host module. The tray controller of each of the N tray modules determines a corresponding installation ordinal number according to the corresponding recognition signal. The tray connection output terminal of the tray connection circuit of the Nth tray module of the N tray modules is grounded to allow the tray connection circuit of the Nth tray module of the N tray modules to generate a connection signal, and the tray controller of the Nth tray module of the N tray modules transmits an Nth installation ordinal number of the N installation ordinal numbers corresponding to the Nth tray module to the host controller of the host module by the communication module.

In summary, in the present disclosure, each tray recognition circuit generates the corresponding recognition signal according to the coupling relation of the corresponding tray module and the host module. Each tray controller determines the corresponding installation ordinal number according to the corresponding recognition signal. Furthermore, since only the tray connection circuit of the last tray module generates the connection signal, only the tray controller of the last tray module transmits the corresponding installation ordinal number to the host controller of the host module according to the connection signal. Therefore, no matter how many the tray modules are installed, there is only one signal transmission during a recognition process. It is not required to send inquiries to the tray modules and wait for responses from tray modules one by one. The present disclosure provides a cost saving way to recognize the tray modules in a short time.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
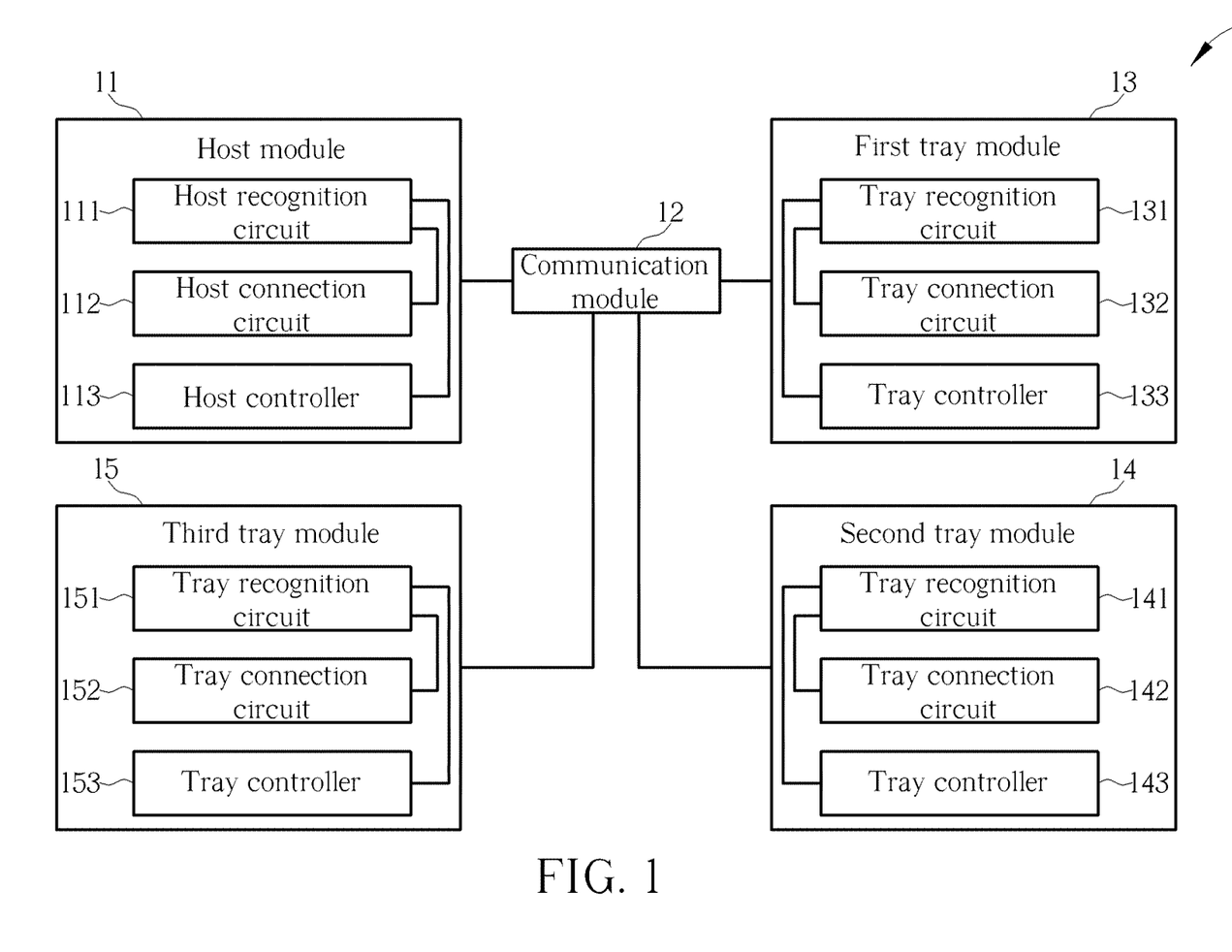
FIG. 1 is a functional block diagram of a tray device according to a first embodiment of the present disclosure.
Figure 2:
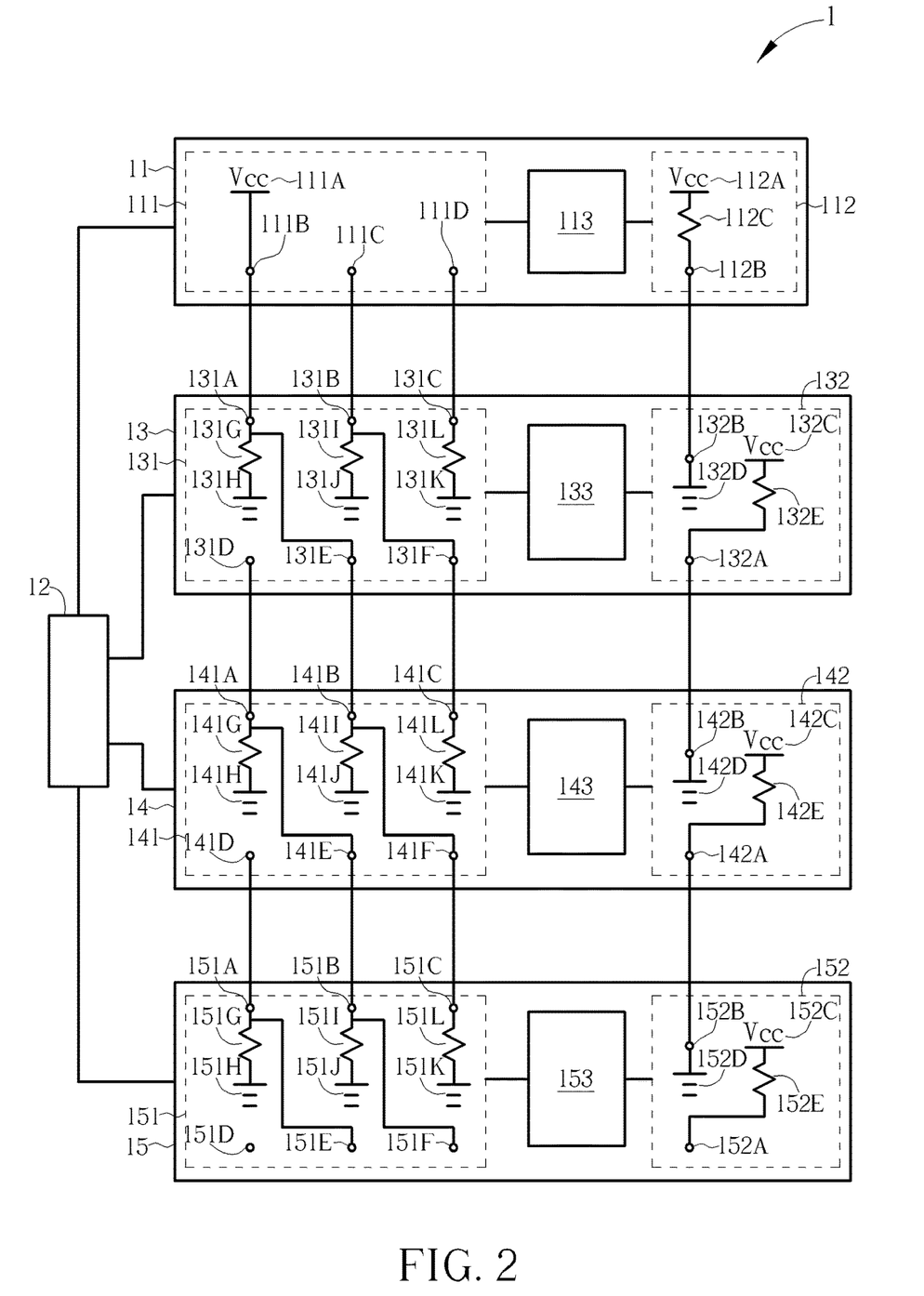
FIG. 2 is a circuit diagram of the tray device according to the first embodiment of the present disclosure.

Please refer to FIG. 1 and FIG. 2. FIG. 1 is a functional block diagram of a tray device 1 according to a first embodiment of the present disclosure. FIG. 2 is a circuit diagram of the tray device 1 according to the first embodiment of the present disclosure. As shown in FIG. 1 and FIG. 2, in this embodiment, the tray device 1 includes a host module 11, a communication module 12, a first tray module 13, a second tray module 14, and a third tray module 15. The tray device 1 can be adapted to a printing apparatus for recognizing that whether the first tray module 13, the second tray module 14 and the third tray module 15 are installed properly. However, the number of the tray modules is not limited to this embodiment. In another embodiment, the tray device can include one tray module, two tray modules or more than four tray modules. It depends on practical demands. The host module 11 includes a host recognition circuit 111, a host connection circuit 112, and a host controller 113 electrically connected to the host recognition circuit 111 and the host connection circuit 112. The first tray module 13 includes a tray recognition circuit 131, a tray connection circuit 132, and a tray controller 133 electrically connected to the tray recognition circuit 131 and the tray connection circuit 132. The second tray module 14 includes a tray recognition circuit 141, a tray connection circuit 142, and a tray controller 143 electrically connected to the tray recognition circuit 141 and the tray connection circuit 142. The third tray module 15 includes a tray recognition circuit 151, a tray connection circuit 152, and a tray controller 153 electrically connected to the tray recognition circuit 151 and the tray connection circuit 152. The communication module 12 is coupled to the host module 11 and the first tray module 13, to the host module 11 and the second tray module 14, and to the host module 11 and the third tray module 15.

The host recognition circuit 111 includes a host recognition voltage source 111A, a first host recognition output terminal 111B, a second host recognition output terminal 111C, and a third host recognition output terminal 111D. The first host recognition output terminal 111B is coupled to the host recognition voltage source 111A. The tray recognition circuit 131 of the first tray module 13 includes a first tray recognition input terminal 131A, a second tray recognition input terminal 131B, a third tray recognition input terminal 131C, a first tray recognition output terminal 131D, a second tray recognition output terminal 131E, a third tray recognition output terminal 131F, a first tray recognition resistor 131G, a first tray recognition ground source 131H, a second tray recognition resistor 131I, a second tray recognition ground source 131J, a third tray recognition ground source 131K, and a third tray recognition resistor 131L. The first tray recognition input terminal 131A is coupled to the second tray recognition output terminal 131E, the first tray recognition ground source 131H, and the first host recognition output terminal 111B. The first tray recognition resistor 131G is coupled to the first tray recognition input terminal 131A and the first tray recognition ground source 131H. The second tray recognition input terminal 131B is coupled to the third tray recognition output terminal 131F, the second tray recognition ground source 131J, and the second host recognition output terminal 111C. The second tray recognition resistor 131I is coupled to the second tray recognition input terminal 131B and the second tray recognition ground source 131J. The third tray recognition input terminal 131C is coupled to the third tray recognition ground source 131K and the third host recognition output terminal 111D. The third tray recognition resistor 131L is coupled to the third tray recognition ground source 131K and the third tray recognition input terminal 131C. In such a way, the tray recognition circuit 131 can generate a first recognition signal according to the aforementioned electrical connection, and the tray controller 133 can determine a first installation ordinal number corresponding to the first tray module 13 according to the first recognition signal. Specifically, in this embodiment, the first recognition signal can be combination of voltage logic levels of the first tray recognition input terminal 131A, the second tray recognition input terminal 131B, and the third tray recognition input terminal 131C of the tray recognition circuit 131 represented in binary. In other words, in this embodiment, the first recognition signal can be represented by (1, 0, 0). The tray controller 133 determines the first installation ordinal number corresponding to the first tray module 13 when the tray controller 133 receives the first recognition signal of (1, 0, 0).

The tray recognition circuit 141 of the second tray module 14 includes a first tray recognition input terminal 141A, a second tray recognition input terminal 141B, a third tray recognition input terminal 141C, a first tray recognition output terminal 141D, a second tray recognition output terminal 141E, a third tray recognition output terminal 141F, a first tray recognition resistor 141G, a first tray recognition ground source 141H, a second tray recognition resistor 141I, a second tray recognition ground source 141J, a third tray recognition ground source 141K, and a third tray recognition resistor 141L. The first tray recognition input terminal 141A is coupled to the second tray recognition output terminal 141E, the first tray recognition ground source 141H, and the first tray recognition output terminal 131D. The first tray recognition resistor 141G is coupled to the first tray recognition input terminal 141A and the first tray recognition ground source 141H. The second tray recognition input terminal 141B is coupled to the third tray recognition output terminal 141F, the second tray recognition ground source 141J, and the second tray recognition output terminal 131E. The second tray recognition resistor 141I is coupled to the second tray recognition input terminal 141B and the second tray recognition ground source 141J. The third tray recognition input terminal 141C is coupled to the third tray recognition ground source 141K and the third tray recognition output terminal 131F. The third tray recognition resistor 141L is coupled to the third tray recognition ground source 141K and the third tray recognition input terminal 141C. In such a way, the tray recognition circuit 141 can generate a second recognition signal according to the aforementioned electrical connection, and the tray controller 143 can determine a second installation ordinal number corresponding to the second tray module 14 according to the second recognition signal. Specifically, in this embodiment, the second recognition signal can be combination of voltage logic levels of the first tray recognition input terminal 141A, the second tray recognition input terminal 141B, and the third tray recognition input terminal 141C of the tray recognition circuit 141 represented in binary. In other words, in this embodiment, the second recognition signal can be represented by (0, 1, 0). The tray controller 143 determines the second installation ordinal number corresponding to the second tray module 14 when the tray controller 143 receives the second recognition signal of (0, 1, 0).

The tray recognition circuit 151 of the third tray module 15 includes a first tray recognition input terminal 151A, a second tray recognition input terminal 151B, a third tray recognition input terminal 151C, a first tray recognition output terminal 151D, a second tray recognition output terminal 151E, a third tray recognition output terminal 151F, a first tray recognition resistor 151G, a first tray recognition ground source 151H, a second tray recognition resistor 151I, a second tray recognition ground source 151J, a third tray recognition ground source 151K, and a third tray recognition resistor 151L. The first tray recognition input terminal 151A is coupled to the second tray recognition output terminal 151E, the first tray recognition ground source 151H, and the first tray recognition output terminal 141D. The first tray recognition resistor 151G is coupled to the first tray recognition input terminal 151A and the first tray recognition ground source 151H. The second tray recognition input terminal 151B is coupled to the third tray recognition output terminal 151F, the second tray recognition ground source 151J, and the second tray recognition output terminal 141E. The second tray recognition resistor 151I is coupled to the second tray recognition input terminal 151B and the second tray recognition ground source 151J. The third tray recognition input terminal 151C is coupled to the third tray recognition ground source 151K and the third tray recognition output terminal 141F. The third tray recognition resistor 151L is coupled to the third tray recognition ground source 151K and the third tray recognition input terminal 151C. In such a way, the tray recognition circuit 151 can generate a third recognition signal according to the aforementioned electrical connection, and the tray controller 153 can determine a third installation ordinal number corresponding to the third tray module 15 according to the third recognition signal. Specifically, in this embodiment, the third recognition signal can be combination of voltage logic levels of the first tray recognition input terminal 151A, the second tray recognition input terminal 151B, and the third tray recognition input terminal 151C of the tray recognition circuit 151 represented in binary. In other words, in this embodiment, the third recognition signal can be represented by (0, 0, 1). The tray controller 153 determines the third installation ordinal number corresponding to the third tray module 15 when the tray controller 153 receives the third recognition signal of (0, 0, 1).

Furthermore, the host connection circuit 112 includes a host connection voltage source 112A, a host connection output terminal 112B, and a host connection resistor 112C. The host connection voltage source 112A is coupled to the host connection output terminal 112B. The host connection resistor 112C is coupled to the host connection voltage source 112A and the host connection output terminal 112B. The tray connection circuit 132 of the first tray module 13 includes a tray connection output terminal 132A, a tray connection input terminal 132B, a tray connection voltage source 132C, a tray connection ground source 132D, and a tray connection resistor 132E. The tray connection output terminal 132A is coupled to the tray connection voltage source 132C. The tray connection input terminal 132B is coupled to the tray connection ground source 132D and the host connection output terminal 112B. The tray connection resistor 132E is coupled to the tray connection voltage source 132C and the tray connection output terminal 132A. In such a way, the host connection output terminal 112B of the host connection circuit 112 is grounded via the tray connection ground source 132D, so that the host controller 113 can determine that the first tray module 13 is coupled to the host module 11 properly. For example, the host controller 113 can determine that a voltage logic level of the host connection output terminal 112B is zero (0), so as to determine that there is a tray module coupled to the host module 11.

The tray connection circuit 142 of the second tray module 14 includes a tray connection output terminal 142A, a tray connection input terminal 142B, a tray connection voltage source 142C, a tray connection ground source 142D, and a tray connection resistor 142E. The tray connection output terminal 142A is coupled to the tray connection voltage source 142C. The tray connection input terminal 142B is coupled to the tray connection ground source 142D and the tray connection output terminal 132A. The tray connection resistor 142E is coupled to the tray connection voltage source 142C and the tray connection output terminal 142A. In such a way, the tray connection output terminal 132A of the tray connection circuit 132 of the first tray module 13 is grounded via the tray connection ground source 142D of the second tray module 14, so that the tray controller 133 of the first tray module 13 can determine that the second tray module 14 is coupled to the first tray module 13 properly. For example, the tray controller 133 of the first tray module 13 can determine that a voltage logic level of the tray connection output terminal 132A is zero (0), so as to determine that there is a next tray module coupled to the first tray module 13.

The tray connection circuit 152 of the third tray module 15 includes a tray connection output terminal 152A, a tray connection input terminal 152B, a tray connection voltage source 152C, a tray connection ground source 152D, and a tray connection resistor 152E. The tray connection output terminal 152A is coupled to the tray connection voltage source 152C. The tray connection input terminal 152B is coupled to the tray connection ground source 152D and the tray connection output terminal 142A. The tray connection resistor 152E is coupled to the tray connection voltage source 152C and the tray connection output terminal 152A. In such a way, the tray connection output terminal 142A of the tray connection circuit 14 of the second tray module 14 is grounded via the tray connection ground source 152D of the third tray module 15, so that the tray controller 143 of the second tray module 14 can determine that the third tray module 15 is coupled to the second tray module 14 properly. For example, the tray controller 143 of the second tray module 14 can determine that a voltage logic level of the tray connection output terminal 142A is zero (0), so as to determine that there is a next tray module coupled to the second tray module 14.

The tray controllers 133, 143, 153 of the first tray module 13, the second tray module 14 and the third tray module 15 can respectively determines the first installation ordinal number, the second installation original number and the third installation original number based on the first recognition signal, the second recognition signal and the third recognition signal, i.e.. the tray controller of each tray module generates a corresponding installation ordinal number based on a corresponding recognition signal. It should be noticed that, in this embodiment, only the tray connection output terminal 152A of the tray connection circuit 152 of the third tray module 15 is not grounded, so that the tray connection circuit 152 of the third tray module 15 can generate a connection signal accordingly. At this moment, the tray controller 153 of the third tray module 15 can determine that the third tray module 15 is the last one of the first tray module 13, the second tray module 14, and the third tray module 15, which are in a series connection, according to the connection signal. For example, the tray controller 153 of the third tray module 15 can determine a voltage logic level of the tray connection output terminal 152A is one (1), not zero, so as to determine there is no next tray module coupled to the third tray module 15. Therefore, the mechanism that the host controller 113 of the host module 11 recognizes the first tray module 13, the second tray module 14, and the third tray module 15 by the communication module 12 is designed that only the tray controller 153 of the third tray module 15 which receives the connection signal can transmit the third installation ordinal number corresponding to the third tray module 15 to the host controller 113 of the host module 11 by the communication module 12. The other tray modules, i.e., the first tray module 13 and the second tray module 14, cannot transmit their installation ordinal numbers, i.e., the first installation number and the second installation ordinal number, to the host module 11. Therefore, the present disclosure can recognize the tray modules in a short time.

Figure 3:
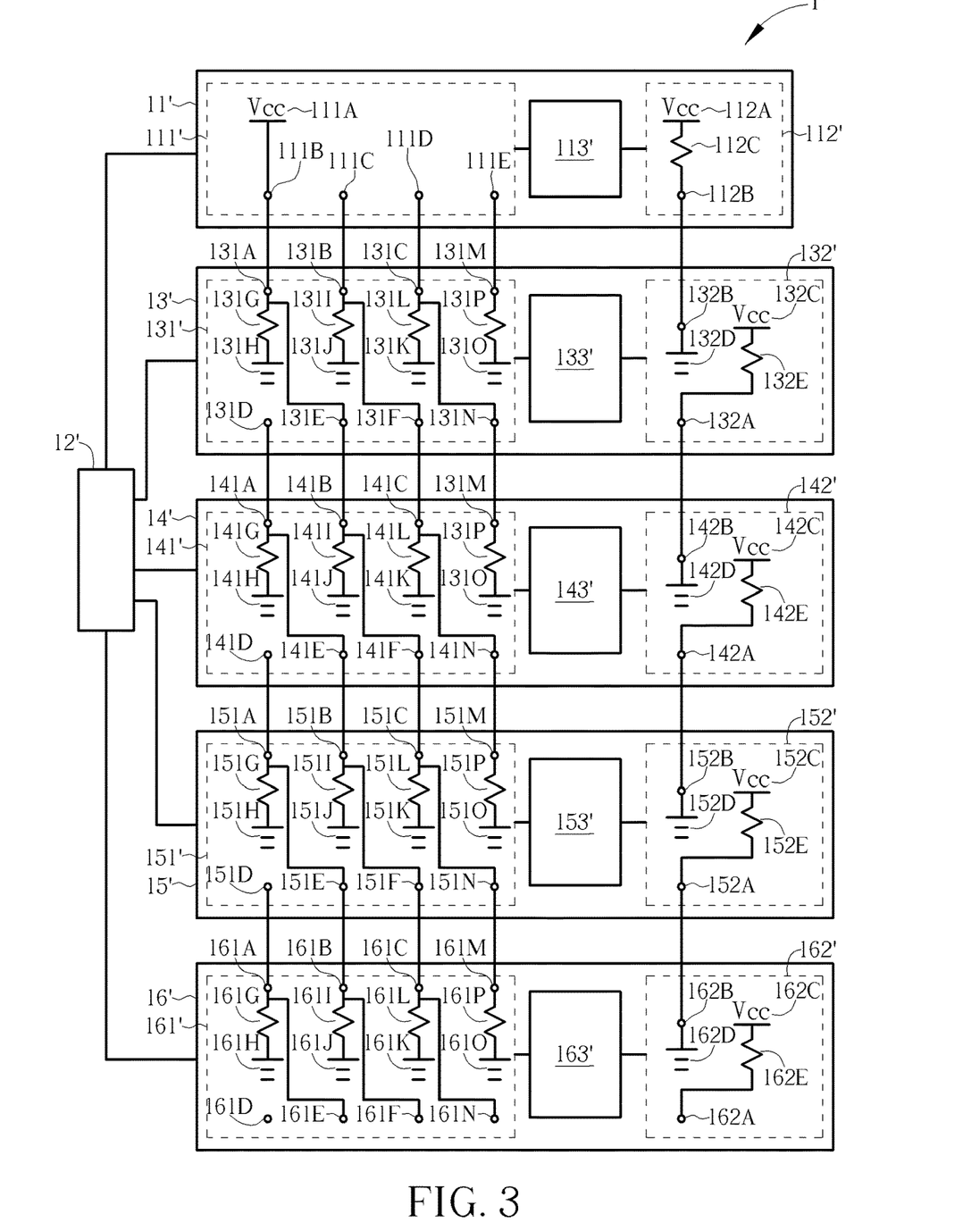
FIG. 3 is a circuit diagram of a tray device according to a second embodiment of the present disclosure.

The number of the tray modules of the present disclosure is not limited to the above-mentioned embodiment. For example, please refer to FIG. 3. FIG. 3 is a circuit diagram of a tray device 1' according to a second embodiment of the present disclosure. As shown in FIG. 3, in this embodiment, the tray device 1' includes a host module 11', a communication module 12', a first tray module 13', a second tray module 14', a third tray module 15', and a fourth tray module 16'. That is, the tray device 1' of this embodiment includes four tray modules. For simplicity, elements of the host module 11', the first tray module 13', the second tray module 14', and the third tray module 15' that have the same structures and functions as those illustrated in the aforementioned embodiment are provided with the same item numbers in this embodiment. However, different from the aforementioned embodiment, a host recognition circuit 111' of the host module 11' further includes a fourth host recognition output terminal 111E. The tray recognition circuits 131', 141', 151' of the first tray module 13', the second tray module 14', and the third tray module 15' includes fourth tray recognition input terminals 131M, 141M, 151M, fourth tray recognition output terminals 131N, 141N, 151N, fourth tray recognition ground sources 1310, 1410, 1510, and fourth tray recognition resistors 131P, 141P, 151P, respectively. The fourth tray recognition input terminals 131M, 141M, 151M are coupled to the fourth tray recognition ground sources 1310, 1410, 1510, respectively. The fourth tray recognition resistors 131P, 141P, 151P are coupled to the fourth tray recognition ground sources 1310, 1410, 1510 and the fourth tray recognition input terminals 131M, 141M, 151M, respectively. The fourth tray recognition output terminals 131N, 141N, 151N are coupled to the third tray recognition input terminals 131C, 141C, 151C. Configuration of the fourth tray module 16' is similar to configurations of the aforementioned tray modules 13', 14', 15'. Detailed description is omitted herein for simplicity. In this embodiment, the tray controller 133', 143', 153', 163' can receive a first recognition signal of (1, 0, 0, 0), a second recognition signal of (0, 1, 0, 0), a third recognition signal of (0, 0, 1, 0), and a fourth recognition signal of (0, 0, 0, 1). Furthermore, only the tray connection output terminal 162A of the tray connection circuit 162' of the fourth tray module 16' is not grounded, so that the tray connection circuit 162' of the fourth tray module 16' can generate the connection signal. Therefore, the mechanism that a host controller 113' of the host module 11' recognizes the first tray module 13', the second tray module 14', the third tray module 15', and the fourth tray module 16' by the communication module 12' is designed that only the tray controller 163' of the fourth tray module 16' which receives the connection signal can transmit a fourth installation ordinal number corresponding to the fourth tray module 16' to the host controller 113' of the host module 11' by the communication module 12'. The other tray modules, i.e., the first tray module 13', the second tray module 14', and the third tray module 15', cannot transmit their installation ordinal numbers, i.e., the first installation number, the second installation ordinal number, and the third installation ordinal number, to the host module 11'. Therefore, the present disclosure can recognize the tray modules in a short time.

Figure 4:
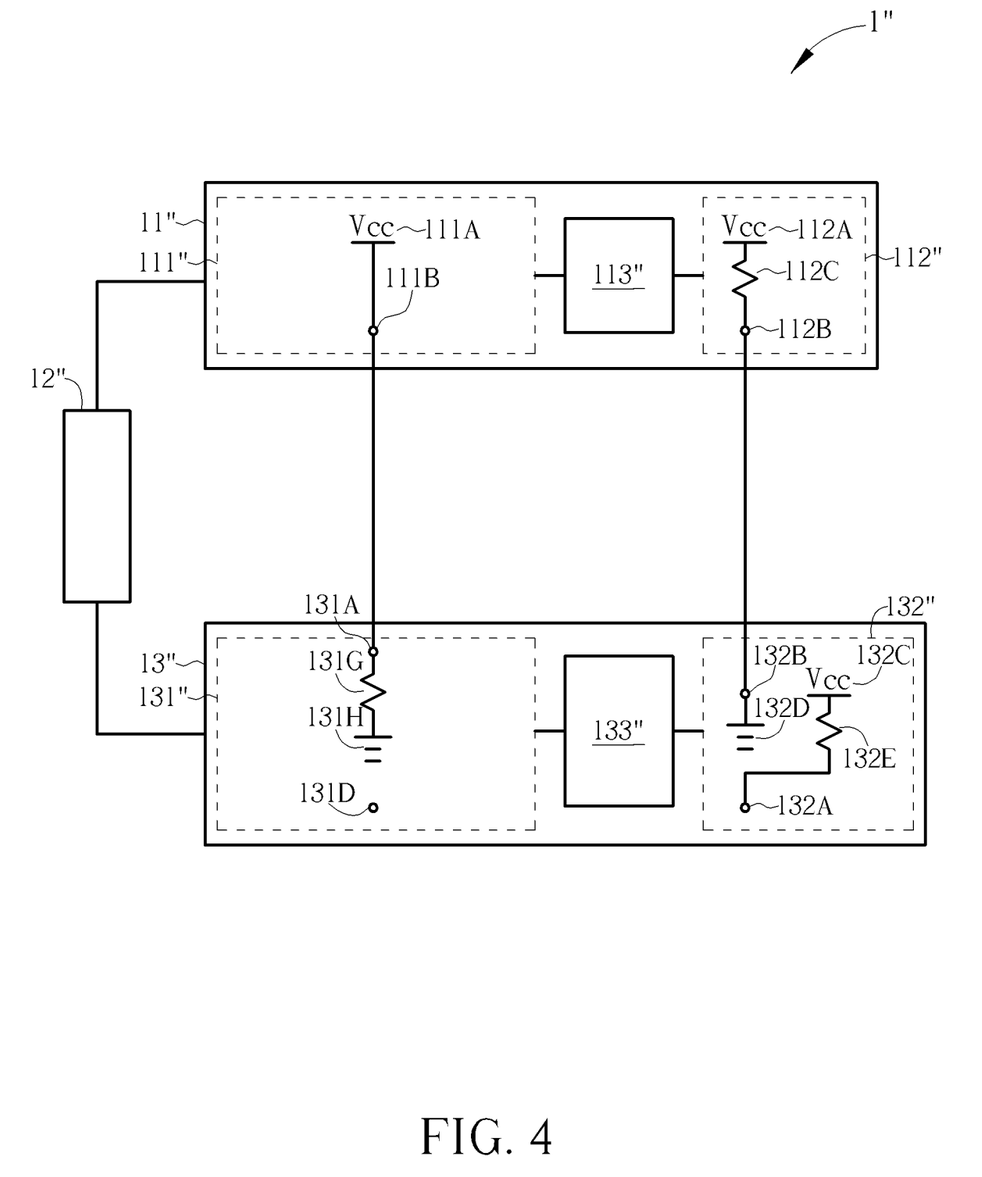
FIG. 4 is a circuit diagram of a tray device according to a third embodiment of the present disclosure.

Please further refer to FIG. 4. FIG. 4 is a circuit diagram of a tray device 1" according to a third embodiment of the present disclosure. As shown in FIG. 4, in this embodiment, the tray device 1" can include a host module 11", a communication module 12", and a first tray module 13". That is, the tray device 1" of this embodiment includes only one tray module. A host recognition circuit 111" of the host module 11" includes the host recognition voltage source 111A and the first host recognition output terminal 111B. A tray recognition circuit 131" of the first tray module 13" includes the first tray recognition input terminal 131A, the first tray recognition output terminal 131D, the first tray recognition resistor 131G, and the first tray recognition ground source 131H. The first tray recognition resistor 131G is coupled to the first tray recognition input terminal 131A and the first tray recognition ground source 131H. Configurations of a host connection circuit 112" of the host module 11" and a tray connection circuit 132" of the first tray module 13" are similar to configurations of the host connection circuits 112, 112' and the tray connection circuit 132, 132' of the aforementioned embodiment. Detailed description is omitted herein for simplicity. In this embodiment, a tray controller 133" of the first tray module 13" can receive a first recognition signal of (1), and the tray connection output terminal 132A of the tray connection circuit 132" of the first tray module 13" is not grounded, so that the tray connection circuit 132" of the first tray module 13" can generate the connection signal. Therefore, the mechanism a host controller 113" of the host module 11" recognizes the first tray module 13" by the communication module 12" is designed that the tray controller 133" of the first tray module 13" which receives the connection signal can transmit the first installation ordinal number corresponding to the first tray module 13" to the host controller 113" of the host module 11". Therefore, the present disclosure can recognize the tray module in a short time.

Figure 5:
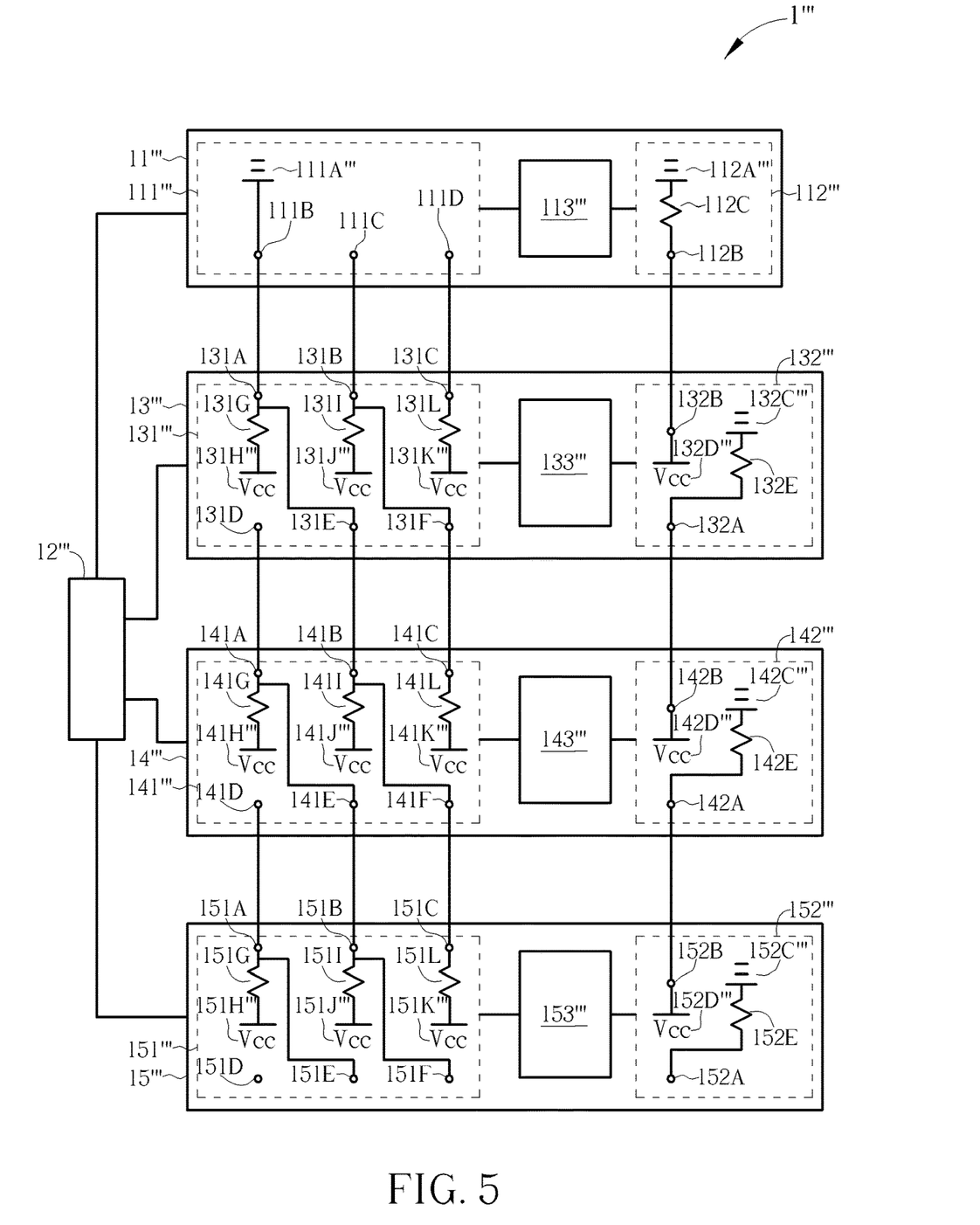
FIG. 5 is a circuit diagram of a tray device according to a fourth embodiment of the present disclosure.

Besides, please further refer to FIG. 5. FIG. 5 is a circuit diagram of a tray device 1''' according to a fourth embodiment of the present disclosure. As shown in FIG. 5, in this embodiment, the tray device 1''' can include a host module 11''', a communication module 12''', a first tray module 13''', a second tray module 14''', and a third tray module 15'''. Different from the aforementioned embodiment, a host recognition circuit 111''' of the host module 11''' includes a host recognition ground source 111A''' for replacing the host recognition voltage source 111A of the aforementioned embodiment, and a host connection circuit 112''' of the host module 11''' includes a host connection ground source 112A''' for replacing the host connection voltage source 112A of the aforementioned embodiment. Furthermore, tray recognition circuit 131''', 141''', 151''' of the first tray module 13''', the second tray module 14''', and the third tray module 15''' include first tray recognition voltage sources 131H''', 141H''', 151H''', second tray recognition voltage sources 131J''', 141J''', 151J''', and third tray recognition voltage sources 131K''', 141K''', 151K''' for replacing the first tray recognition ground sources 131H, 141H, 151H, the second tray recognition voltage sources 131J, 141J, 151J, and the third tray recognition voltage sources 131K, 141K, 151K. Besides, tray connection circuits 132''', 142''', 152''' of the first tray module 13''', the second tray module 14''', and the third tray module 15''' include tray connection ground sources 132C''', 142C''', 152C''' and tray connection voltage sources 132D''', 142D''', 152D''' for replacing the tray connection voltage sources 132C, 142C, 152C and the tray connection ground sources 132D, 142D, 152D. In such a way, the tray controller 133''', 143''', 153''' can receive a first recognition signal of (0, 1, 1), a second recognition signal of (1, 0, 1), and a third recognition signal of (1, 1, 0), and the tray controller 133''', 143''', 153''' of the first tray module 13''', the second tray module 14', and the third tray module 15''' can determine voltage logic level of the tray connection output terminals 132A, 142A, 152A are 1, 1, and 0. In other words, in this embodiment, only the tray connection output terminal 152A''' of the tray connection circuit 152''' of the third tray module 15''' is grounded, i.e., the voltage logic level is zero (0), so that the tray connection circuit 152''' of the third tray module 152''' can generate the connection signal. At this moment, the tray controller 153''' of the third tray module 15''' can determine the third tray module 15''' is the last one of the first tray module 13''', the second tray module 14', and the third tray module 15', which are in a series connection, according to the connection signal. Therefore, the mechanism that the host controller 113''' of the host module 11''' recognizes the first tray module 13''', the second tray module 14''', and the third tray module 15''' by the communication module 12 is designed that only the tray controller 153''' of the third tray module 15''' which receives the connection signal can transmit the third installation ordinal number corresponding to the third tray module 15''' to the host controller 113''' of the host module 11''' by the communication module 12'''. The other tray modules, i.e., the first tray module 13''' and the second tray module 14''', cannot transmit their installation ordinal numbers, i.e., the first installation ordinal number and the second installation ordinal number, to the host module 11'''. Therefore, the present disclosure can recognize the tray modules in a short time.

In contrast to the prior art, in the present disclosure, each tray recognition circuit generates the corresponding recognition signal according to the coupling relation of the corresponding tray module and the host module. Each tray controller determines the corresponding installation ordinal number according to the corresponding recognition signal. Furthermore, since only the tray connection circuit of the last tray module generates the connection signal, only the tray controller of the last tray module transmits the corresponding installation ordinal number to the host controller of the host module according to the connection signal. Therefore, no matter how many the tray modules are installed, there is only one signal transmission during a recognition process. It is not required to send inquiries to the tray modules and wait for responses from tray modules one by one. The present disclosure provides a cost saving way to recognize the tray modules in a short time.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A tray device capable of recognizing tray modules, the tray device comprising:
 a host module comprising a host recognition circuit, a host connection circuit and a host controller electrically connected to the host recognition circuit and the host connection circuit;
 at least one tray module comprising:
  a tray recognition circuit for generating a recognition signal according to an electrical connection of the tray recognition circuit and the host recognition circuit;
  a tray connection circuit for generating a connection signal; and
  a tray controller electrically connected to the tray recognition circuit and the tray connection circuit, the tray controller determining an installation ordinal number corresponding to the at least one tray module according to the recognition signal; and
 a communication module coupled to the host module and the at least one tray module;
 wherein the tray controller transmits the installation ordinal number to the host controller of the host module by the communication module when the tray connection circuit generates the connection signal, and the host controller determines a number of the at least one tray module coupled to the host module according to the installation ordinal number.

2. A tray device capable of recognizing tray modules, the tray device comprising:
 a host module comprising:
  a host connection circuit comprising a host connection voltage source, a host connection output terminal and a host connection resistor, the host connection voltage source being coupled to the host connection output terminal, the host connection resistor being coupled to the host connection voltage source and the host connection output terminal;
  a host recognition circuit comprising a host recognition voltage source and N host recognition output terminals, a first host recognition output terminal of the N host recognition output terminals being coupled to the host recognition voltage source; and
  a host controller electrically connected to the host connection circuit and the host recognition circuit;
 N tray modules, each of the N tray modules comprising:
  a tray recognition circuit comprising:
   N tray recognition ground sources;
   N tray recognition input terminals, each of the N tray recognition input terminals being coupled to the corresponding tray recognition ground source;
   N tray recognition resistors, each of the N tray recognition resistors being coupled to the corresponding tray recognition input terminal and the corresponding tray recognition ground source; and
   N tray recognition output terminals, a second tray recognition output terminal to an Nth tray recognition output terminal of the N tray recognition output terminals being respectively coupled to a first tray recognition input terminal to an N−1th tray recognition input terminal of the N tray recognition input terminals;
  a tray connection circuit comprising:
   a tray connection ground source;
   a tray connection input terminal coupled to the tray connection ground source;
   a tray connection voltage source;
   a tray connection output terminal coupled to the tray connection voltage source; and
   a tray connection resistor coupled to the tray connection voltage source and the tray connection output terminal; and
  a tray controller electrically connected to the tray recognition circuit and the tray connection circuit; and
 a communication module coupled to the host module and the N tray modules;
 wherein the N tray recognition input terminals of the tray recognition circuit of a first tray module of the N tray modules are respectively coupled to the N host recognition output terminals of the host recognition circuit of the host module, the tray connection input terminal of the tray connection circuit of the first tray module of the N tray modules is coupled to the host connection output terminal of the host connection circuit of the host module, the N tray recognition input terminals of the tray recognition circuit of each of a second tray module to an Nth tray module of the N tray modules are respectively coupled to the N tray recognition output terminals of the tray recognition circuit of each of the first tray module to an N−1th tray module of the N tray modules, the tray connection input terminal of the tray connection circuit of each of the second tray module to the Nth tray module of the N tray modules is coupled to the tray connection output terminal of the tray connection circuit of each of the first tray module to the N−1th tray module of the N tray modules, the tray recognition circuit of each of the N tray modules generates a corresponding recognition signal according to coupling relation of the N tray modules and the host module, the tray controller of each of the N tray modules determines a corresponding installation ordinal number according to the corresponding recognition signal, the tray connection output terminal of the tray connection circuit of the Nth tray module of the N tray modules is not grounded to allow the tray connection circuit of the Nth tray module of the N tray modules to generate a connection signal, and the tray controller of the Nth tray module of the N tray modules transmits an Nth installation ordinal number of the N installation ordinal numbers corresponding to the Nth tray module to the host controller of the host module by the communication module.

3. A tray device capable of recognizing tray modules, the tray device comprising:
   a host module comprising:
      a host connection circuit comprising a host connection ground source, a host connection output terminal and a host connection resistor, the host connection ground source being coupled to the host connection output terminal, the host connection resistor being coupled to the host connection ground source and the host connection output terminal;
      a host recognition circuit comprising a host recognition ground source and N host recognition output terminals, a first host recognition output terminal of the N host recognition output terminals being coupled to the host recognition ground source; and
      a host controller electrically connected to the host connection circuit and the host recognition circuit;
   N tray modules, each of the N tray modules comprising:
      a tray recognition circuit comprising:
         N tray recognition voltage sources;
         N tray recognition input terminals, each of the N tray recognition input terminals being coupled to the corresponding tray recognition voltage source;
         N tray recognition resistors, each of the N tray recognition resistors being coupled to the corresponding tray recognition input terminal and the corresponding tray recognition voltage source; and
         N tray recognition output terminals, a second tray recognition output terminal to an Nth tray recognition output terminal of the N tray recognition output terminals being respectively coupled to a first tray recognition input terminal to an N−1th tray recognition input terminal of the N tray recognition input terminals;
      a tray connection circuit comprising:
         a tray connection voltage source;
         a tray connection input terminal coupled to the tray connection voltage source;
         a tray connection ground source;
         a tray connection output terminal coupled to the tray connection ground source; and
         a tray connection resistor coupled to the tray connection ground source and the tray connection output terminal; and
      a tray controller electrically connected to the tray recognition circuit and the tray connection circuit; and
   a communication module coupled to the host module and the N tray modules;
   wherein the N tray recognition input terminals of the tray recognition circuit of a first tray module of the N tray modules are respectively coupled to the N host recognition output terminals of the host recognition circuit of the host module, the tray connection input terminal of the tray connection circuit of the first tray module of the N tray modules is coupled to the host connection output terminal of the host connection circuit of the host module, the N tray recognition input terminals of the tray recognition circuit of each of a second tray module to an Nth tray module of the N tray modules are respectively coupled to the N tray recognition output terminals of the tray recognition circuit of each of the first tray module to an N−1th tray module of the N tray modules, the tray connection input terminal of the tray connection circuit of each of the second tray module to the Nth tray module of the N tray modules is coupled to the tray connection output terminal of the tray connection circuit of each of the first tray module to the N−1th tray module of the N tray modules, the tray recognition circuit of each of the N tray modules generates a corresponding recognition signal according to coupling relation of the N tray modules and the host module, the tray controller of each of the N tray modules determines a corresponding installation ordinal number according to the corresponding recognition signal, the tray connection output terminal of the tray connection circuit of the Nth tray module of the N tray modules is grounded to allow the tray connection circuit of the Nth tray module of the N tray modules to generate a connection signal, and the tray controller of the Nth tray module of the N tray modules transmits an Nth installation ordinal number of the N installation ordinal numbers corresponding to the Nth tray module to the host controller of the host module by the communication module.

* * * * *